Dec. 13, 1966 E. H. PULL 3,290,995
METHOD AND APPARATUS FOR PRODUCING PLASTIC INSULATED
ELECTRICAL CONDUCTORS
Filed Dec. 4, 1964 5 Sheets-Sheet 1
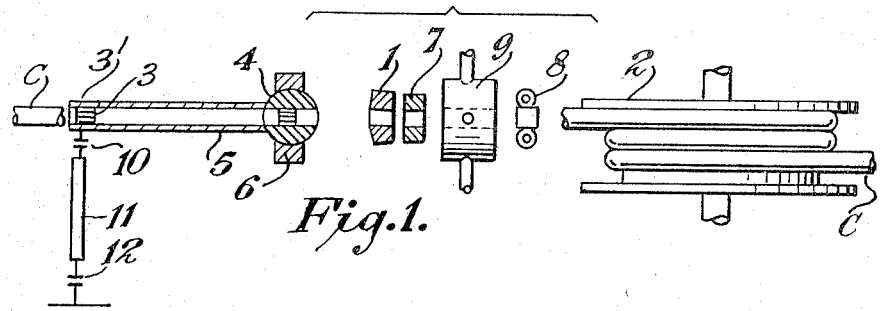
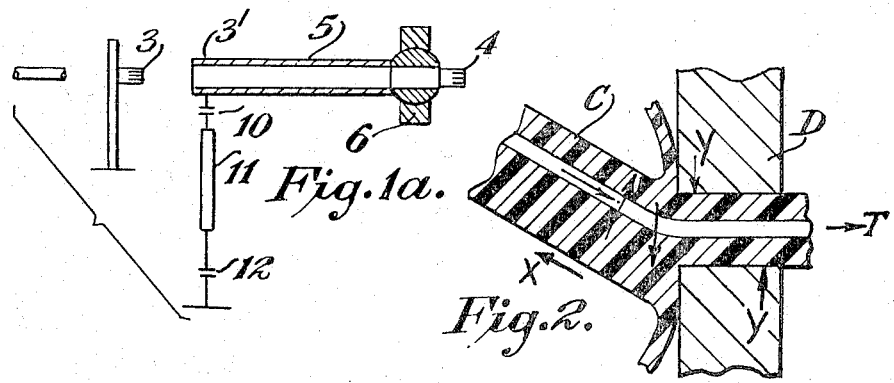
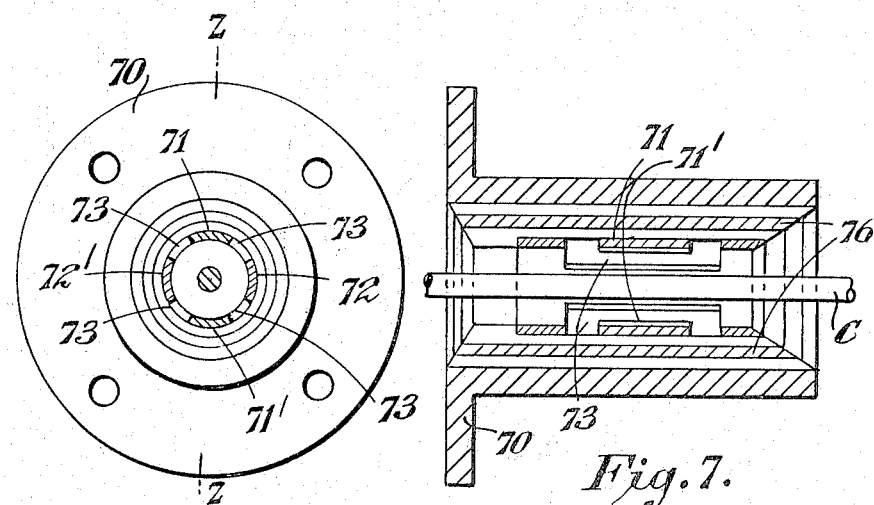
Inventor:
Ernest Harold Pull
BY Baldwin & Wight
Attorneys

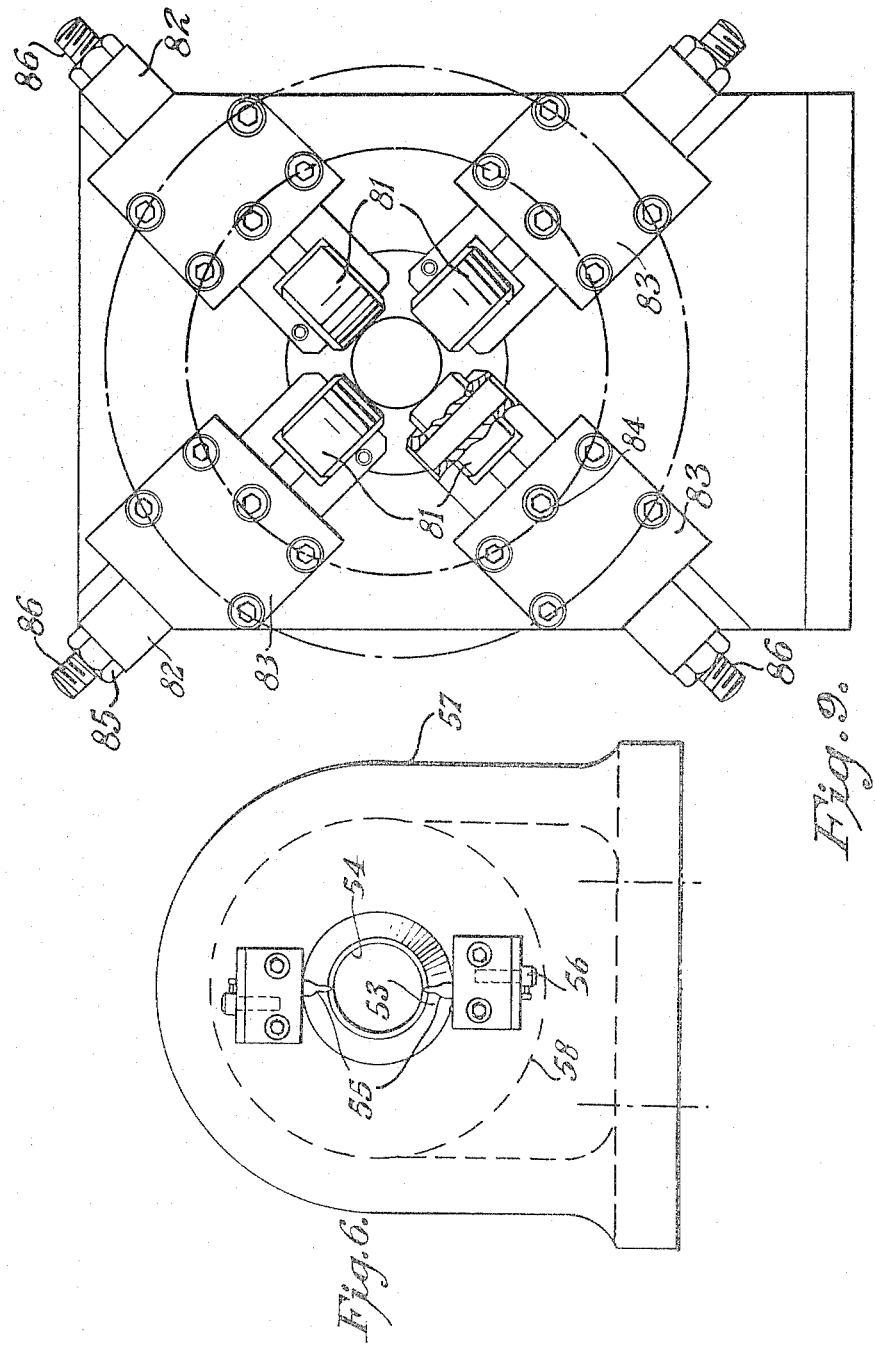

Dec. 13, 1966  E. H. PULL  3,290,995
METHOD AND APPARATUS FOR PRODUCING PLASTIC INSULATED
ELECTRICAL CONDUCTORS
Filed Dec. 4, 1964  5 Sheets-Sheet 5

Inventor:
Ernest Harold Pull
BY Baldwin & Wight
Attorneys

United States Patent Office 3,290,995
Patented Dec. 13, 1966

3,290,995
METHOD AND APPARATUS FOR PRODUCING PLASTIC INSULATED ELECTRICAL CONDUCTORS
Ernest Harold Pull, London, England, assignor to Submarine Cables Limited, London, England, a corporation of Great Britain
Filed Dec. 4, 1964, Ser. No. 415,892
Claims priority, application Great Britain, Dec. 10, 1963, 48,837/63
17 Claims. (Cl. 90—24)

This invention relates to apparatus for use in the manufacture of plastic-insulated electrical conductors. It is particularly, but not exclusively, applicable to the manufacture of large-diameter polythene-insulated conductor, known in the art as "core," for coaxial submarine cable used for carrier telephony, television and similar purposes. By the use of the invention it is not only possible to simplify the machinery, make it more reliable and reduce the cost of its maintenance, but also to improve the quality of the product.

The outer surface of the core of a submarine carrier telephone cable must be smooth, i.e. free from all blemishes and imperfections, accurately cylindrical and of a constant outer diameter and the inner conductor must be precisely centred in coaxial relation to the external surface of the insulation. Not only one these properties obviously advantageous for electrical reasons, but it is found that the mechanical performance of the outer conductor of a coaxial cable, for example its ability to withstand bends, depends considerably on the accuracy of finish of the core.

It is known to correct minor errors in extrusion by extruding the core with an oversize outer diameter, and by subsequently trimming it to the desired size, hereinafter referred to as "shaving," by means of a rotating cutting head when the insulation is cold, and therefore mechanically stable. Such machines are apt to require considerable maintenance in view of the high speed of operation; the cutting edges of the tools frequently require attention, and the swarf, usually electrified by friction, is liable to stick in corners. It frequently happens that the finished surface shows slight machine marks due to the finite width of cut, vibration, and the presence of swarf.

In some shaving machines the eccentricity of the core is sensed electrically after shaving and corrections are made by laterally traversing the entrance die, in two orthogonal directions, by means of devices resembling the slide-rest of a lathe. As is well-known, slide-rests frequently develop backlash to the extent of a thousandth of an inch or so, even with quite good maintenance.

It is also known to correct for eccentricity during extrusion by moving the central orifice or "pin" of the extrusion die in accordance with eccentricity measurements made on the extruded core. However, polyethylene has a poor thermal conductivity, and the insulation of large-diameter cores takes a long time to cool down and become stable, so that meaningful measurements of eccentricity must necessarily be made some considerable time after extrusion. The correction process is thus very slow. Moreover, if the core is to be shaved anyway to control the diameter or to improve the surface finish, there is not much point in improving the eccentricity at an early stage, for other eccentricity may be introduced during shaving, unless the correction process is repeated.

It has been found advisable in the submarine cable industry to use machinery having as few moving parts as possible in view of the cost and great length of the product, and the extremely high degree of reliability required. Should breakdown of the machinery occur, it may be necessary to scrap many nautical miles of expensive cable. Thus, in principle, it is not a good plan to attempt to shave hundreds of nautical miles of core with a machine cutting with a pitch in the order of say 0.01 inches, because this will involve hundreds of millions of revolutions of the cutting head.

Accordingly we have experimented with simplified shaving devices and have found that many moving parts can be eliminated, the quality of the shaved surface can at the same time be improved and the swarf more easily removed. Indeed, the shaving device to be described works just as well even when the cable is slightly bent or is fed obliquely into the cutting head. There is no sign of ellipticity nor is there any significant change in diameter, but the device can thus be made to shave the core eccentrically. This effect can be used to provide a simplified adjustment for correcting eccentricity, with the additional advantage that the movement of the control device is much larger than the adjustment effected, and a simpler and more robust construction is therefore possible. Also the backlash is negligible.

We have also found that if a device can be produced which can shave many nautical miles of cable with a good finish without attention, the capacitance of the cable is held within such close limits that an adjustment to control the capacitance by varying the diameter is no longer required. In fact it is found that the reason that such control devices were ever used is to correct for unavoidable errors in the shaving head, and not to compensate for variations in the permittivity of the dielectric or variations in the diameter of the inner conductor.

According to the present invention, a method of shaving the extruded thermoplastic insulation of an electrical conductor so as to leave an accurate cylindrical surface having a precisely predetermined diameter, includes the steps of drawing the insulated conductor, hereinafter called the "core," through a fixed cutting die, by means of a capstan or like device capable of exerting considerable mechanical tension, so as to remove excess insulating material, the resulting swarf being slit by at least one parting knife to enable it to be removed in the form of at least one continuous ribbon, the core being presented to the cutting die by at least two guides which determine its position with respect to the die and its direction of approach, at least one of these guides, namely that nearer to the die, being in the form of a collet or similar resilient device, capable of accommodating variations in the diameter and shape of the extruded insulation, the shaved core being supported by a further guide, closely fitting the shaved surface but not necessarily resilient, in coaxial relationship with the cutting die and close to it, possibly forming part of the die itself.

Further, according to the invention, the said method includes steps for correcting the eccentricity of the conductor within the extruded insulation of the core, one or both of the guides which present the core to the die being capable of slight transverse movement with respect to the axis of the die, whereby the core may be deflected so as to present it to the cutting edge with the axis of the conductor intersecting the axis of the die at a very small angle, or preferably tangentially thereto, in the plane of the cutting edge, the shaved core being straightened and drawn into coaxial alignment with the axis of the die by the high mechanical tension provided by the capstan, the straightened core being drawn through a capacitative electrode system whereby any residual eccentricity of the conductor within the shaved core may be ascertained by appropriate electrical apparatus, whose indications are used to control the movement of the guide or guides, so as to reduce any residual eccentricity to zero or to an acceptable amount.

Further according to the invention, at least that guide which is nearer the cutting die may be mounted in a tube-like member pivoted in a spherical joint, universal joint or gimbals, also located near the cutting die and coaxial therewith, the other end of the tube, into which the core enters, being moved by two linear actuators or equivalent control devices in approximately orthogonal relationship with each other, and approximately in a transverse direction with respect to the axis of the die, whereby the core is deflected slightly just before it enters the die, the amount of eccentricity correction thereby obtained being small compared with the movement of the actuators. The other guide or collet may be fixed in an axial position near the entry to the tube, or alternatively it may be mounted on the tube itself at or near the entry end.

Further according to the invention, the capacitative electrode system by which the amount of the eccentricity after shaving is determined, is made shorter in axial length than has hitherto been customary, by placing the four electrodes, in the form of quadrantal segments of a cylindrical surface, in the same axial position, i.e. between the same two transverse planes, and by providing them with a common guard electrode. The capacitative electrode system is placed between two closely spaced guides which locate the shaved core (the shaving die itself can be one of these guides) so that the outer surface of the insulation is held straight and in coaxial relationship with the die, whereby measurements of eccentricity are not affected by any deformation of the core due to mechanical handling prior to shaving, including the deflection aforementioned. Although four electrodes have been used in this particular application, three, with appropriate vector summation, would suffice.

The high mechanical tension necessary to force the core through the cutting die is very useful as a means of straightening the core thus making possible more accurate eccentricity measurements, or, for a given accuracy, reducing the effect of bends in the core. Moreover the tension occurs mainly in the shaved part of the core, where it is useful and is much lower in the unshaved part where it hardly increases the forces necessary to deflect the cable and adds very little to the wear of the guides and actuators.

Referring now to some of the details of the invention, the cutting die is a solid ring but may be formed in two parts to permit its replacement, when worn, without removal of the core from the apparatus. (The division between the two parts is not a plane surface which includes the axis, but a plane, for example, inclined to the axis or so arranged that the dividing line along those inner surfaces which touch the core is not parallel to the axis. By this arrangement, tool marks at the dividing line between the two parts of the die, do not appear on the final product.)

In this particular application the die has a sharply defined cutting edge, with small angles of rake and clearance, the angle of the edge thus approaching 90°. The die is made of very hard material, tungsten carbide, brazed into a mild steel block. The die and its backing block preferably occupy a length in an axial direction shorter than the diameter of the core, which may enter obliquely or bent.

Generally, the rake angle, clearance angle, length of land, die material and condition of the cutting edge may be chosen empirically for the size and grade of plastic material being shaved.

As mentioned above, two alternative forms of guidance system have been successfully used by the applicants. In one of these the first guide entered by the core is fixed and only the second is moved by the actuators, through the tubular lever, whereas in the other arrangement, described in the provisional application, both guides are mounted on the tubular lever. In general it is preferred to use a fixed first guide, particularly when the core is large and does not bend readily. The guidance system with the movable first guide can be designed so as to introduce the core into the die with the axis of the conductor tangential to the axis of the die, but in view of the high mechanical tension and the couples introduced by a die when removing an eccentric layer of swarf, the tangential introduction of the core is not an important advantage.

It is assumed that the eccentricity measured in a piece of core at one given point will be strongly correlated with that measured at any other point within say a metre length of core, so that it is justified to take readings of eccentricity on shaved core and to use the information so obtained to adjust the control devices which deflect the core. Similar assumptions are normally made in respect of many types of cable making machinery.

At least three advantages are obtained by measuring the eccentricity on shaved core, as compared with measurements on newly extruded core:

(a) Since the other surface of the core is cylindrical and precisely defined, and the material cold and stable, the readings are more meaningful.

(b) By making use of the well-known technique of negative feedback, the eccentricity of the finished product can be reduced to any desired extent, in spite of non-linearity or interaction in the control device.

(c) If the core has to be shaved anyway, any eccentricity remaining after shaving must be measured to ensure that the quantity of the core is satisfactory.

For these reasons, correction of eccentricity during the shaving operation gives better results than correction during extrusion.

The invention is described by way of example with reference to the accompanying drawings in which:

FIGURE 1 illustrates in diagrammatic form one embodiment of a core-shaving device according to the invention.

FIGURE 1a shows an alternative form of core-guidance device in diagrammatic form.

FIGURE 2 illustrates the bending of the core in the cutting die.

FIGURE 6 is an end-view of the cutting-die assembly shown in FIGURE 5.

FIGURE 7 is a view in cross-section of an eccentricity-sensing head or capacitive electrode assembly drawn to a scale different from that used in FIGURES 5 and 6.

FIGURE 8 is an end-view of the sensing head shown in FIGURE 7.

FIGURE 9 is an end-view of roller core-guide.

Figures 4, 5:
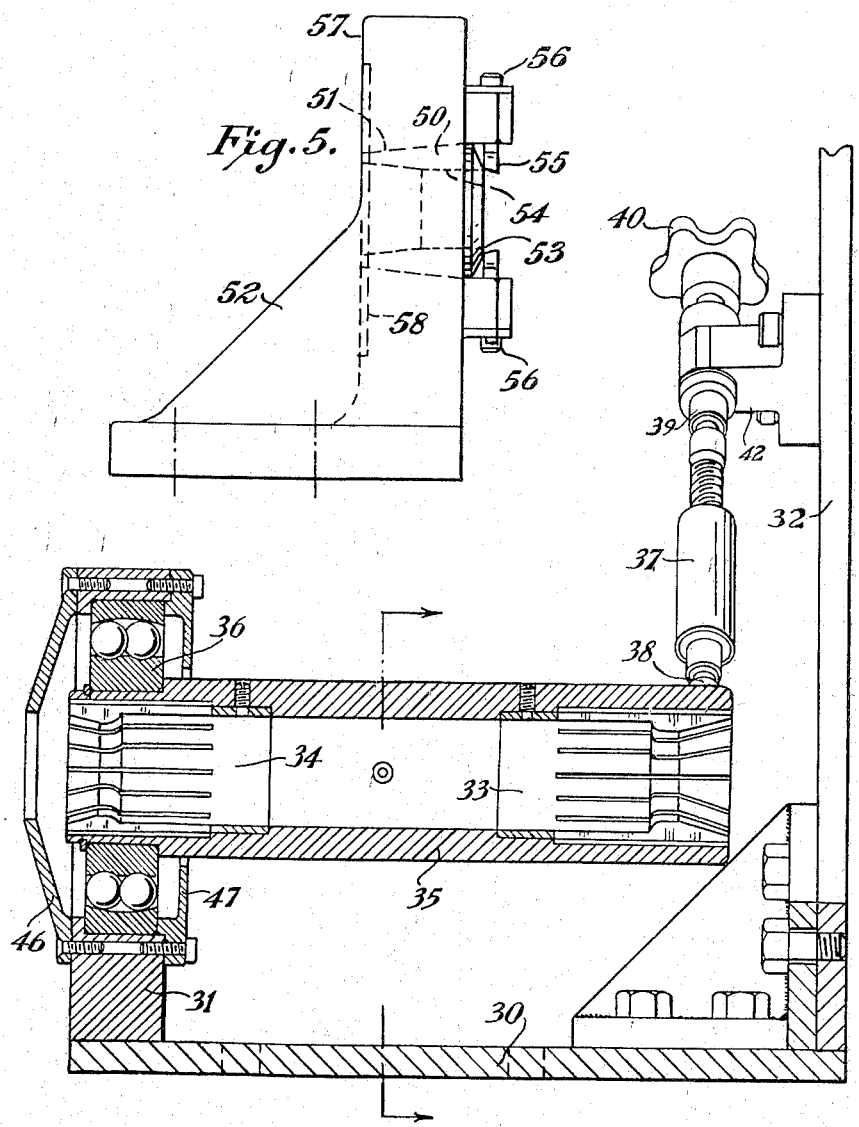
FIGURE 4 is a sectional view on line 4—4 of FIGURE 3 showing a guiding device.
FIGURE 5 is an elevation on an enlarged scale of a cutting-die assembly.

Referring to FIGURE 1, the core-shaving device according to the invention consists of a cutting or shaving die 1 through which the core C is pulled by a capstan 2. The core is guided through the die 1 by supports at a number of points on both sides. In this embodiment, the core first passes through a deflecting device, in this case represented by two collets 3 and 4, mounted in a tubular support 5, which is pivoted, at t he end nearest the die, in a spherical or universal joint or gimbals at 6. The core can thus be presented to the cutting die with the conductor centred in the die even if the original extrusion was eccentric. The collet 4 might be placed at 6, as shown, or on either side of 6. In FIGURE 4, for example, it is shown projecting slightly beyond 6, i.e. a little nearer to the die 1. It is less important that the guide 3 should be a collet, because clearance at that point would have less effect; the guide 3 could thus be a fixed die or even the open end of the tube 5, but a collet is preferred, as it would avoid jamming the machine if the core had some isolated irregularity, such as a point at which repairs had been carried out.

After passing the cutting die 1, the core is centred by one or more supports, fixed in coaxial relationship with the cutting die. These latter supports bear on the shaved core and may therefore be fixed dies of predetermined diameter or fixed asemblies of rollers, whereas the collets 3 and 4 are designed to tolerate small irregularities in diameter and shape due to errors in extrusion.

The fixed support for the shave core is provided by a die ring 7 separate from the cutting die, or a "land" (cylindrical portion) just behind the cutting edge so that it constitutes an extension or part of the cutting die. Another support for the shave core may be the roller assembly 8, through which the core is drawn by the capstan 2. The number and nature of the supports after the cutting die are not important, provided that the core is accurately located within the sensing device.

The sensing device 9, which determines the eccentricity of the shaved core, must be located at a point such that the outer shaved surface is held precisely in a datum position so that the position of the conductor within the core can be accurately determined. It is therefore advantageous for the sensing device 9 to be as short as possible and to place it between two closely spaced supports, so that errors due to sag or slight bends in the conductor caused by the deflection of the core by the guides 3 and 4, or by other prior mechanical handling, are minimized. As already pointed out, it is an advantage that the mechanical tension in the core is so high at this point that the core will be pulled straight even if it were slightly bent.

The indications of the sensing device 9 are used to control the position of the tube 5, either by manual adjustment or preferably by automatic means, using the principles of negative feedback. The free end 3' of the tube 5 is attached by two universal joints, of which one 10 is shown, to two linear actuators of which one 11 is shown, which are anchored to the frame of the machine through two other universal joints, of which one 12 is shown. Only one set of these components, namely 10, 11 and 12 is shown on FIGURE 1, it being understood that the other set is similar, but acts in a direction roughly perpendicular to the plane of the drawing. Universal joints are preferred for the particular embodiment chosen, because it is also required that these joints apply the necessary torque to a screw-jack type of acutator, but otherwise ball and socket joints or resilient links could be used. The length of the actuators 11 must be sufficient to ensure that the orthogonal relationship is substantially obtained. If this were not so, the ffect of one actuator 11 would depend on the setting of the other actuator and neither would work in its allotted plane.

One of the advantages of the core guidance device of the present invention is that the actual movement of the actuators 11 is large compared with the transverse movement of the core, by one or two orders of magnitude. Accordingly the mechanism of the actuators does not have to meet any very stringent requirements either in respect of the amount of force required or the amount of backlash permissible, although naturally normal precautions in construction would be taken in accordance with good engineering practice.

For the spherical joint at 6 satisfactory results have been obtained using a self-aligning ball-race. The outer race has an accurate spherical surface, and the cage and ball assembly forms an equally accurate counterpart. It will be understood that the ball race is not required to rotate. Although there is no appreciable torque applied to it, in the present application there is nothing to stop it rotating slightly. Rotation through a small arc is not detrimental and permits the sliding surfaces to move slightly and minimize wear. Should it be found necessary to prevent the rotation, this can be done with various known devices such as tubular bellows, gimbals or parallel-acting leaf springs.

It will be noted that the stiffness of the core is an important factor in avoiding backlash. The control force is always directed radially in a sense such as to increase the eccentricity correction, against the force exerted by the core stiffness, whereas when the transverse movement of the core is effected by a device such as a lathe slide-rest, even if a spring is incorporated as a means of cutting down backlash, the reaction of the cutting device will sometimes be taken by the actuator and sometimes by the antibacklash spring, depending on the sign of the transverse movement.

Although FIGURE 1 shows a hauling device 2 in the form of a capstan immediately behind the guide 8, this is not essential. The hauling device, which may, for example, be of the "caterpillar" type or a multiple V-sheave gear, need not be part of the same machine, and it would be quite possible to introduce some other manufacturing process at this point, such as the application of the outer conductor, the hauling device providing the necessary traction for this process also.

It has been found that other arrangements for deflecting the core to present it eccentrically to the cutting die, are successful, such as moving the die 1 nearer the collet 4 or particularly that shown in FIGURE 1a, which only differs from the corresponding elements in FIGURE 1 in respect of the position of the collet 4, which must be mounted beyond the pivot 6, and the fact that collet 3 is mounted on the frame of the machine. The core still enters the tube 5 but does not touch its walls, even at the entry end 3'. In this case the core is presented obliquely to the cutting die 1 when it is desired to correct eccentricity, the obliquity being less than it would be if the die 3 were mounted in the end of the tube. The core is bent as it enters the die. It is difficult to ascertain what is happening at this point but it is found that no error in measuring the eccentricity arises, which indicates that the shaved core reaches the axial position by the time it passes through the electrode assembly. The measured eccentricity correction, for a given position of the guides, corresponds closely to that to be expected on the assumption that the core passes through both guides and reaches the die without bending. The core does in fact appear to bend, but relatively sharply, just as it enters the die, as shown in FIGURE 2.

The tension T of the capstan, opposed by the asymmetric pressure of the die, gives rise to longitudinal compression in the insulation at the part X, and tension in the conductor and its nearby insulation, both stresses extending ahead of the die for a distance of about a core diameter. This couple may of course be replaced by a couple of the same magnitude and sign, formed by transverse forces, at a similar position, ahead of the die. This couple will be opposed by an equal and opposite couple provided by reaction on the walls of the die at the points Y. From the theory of beams it can be seen that the effect of these forces is to bend the core through a very small angle within a distance of about a core diameter, as is observed. It is, however, only claimed that this is is a qualitative explanation, in accordance with the facts. The tension is sufficient to straighten the shaved core in any case.

Figure 3:
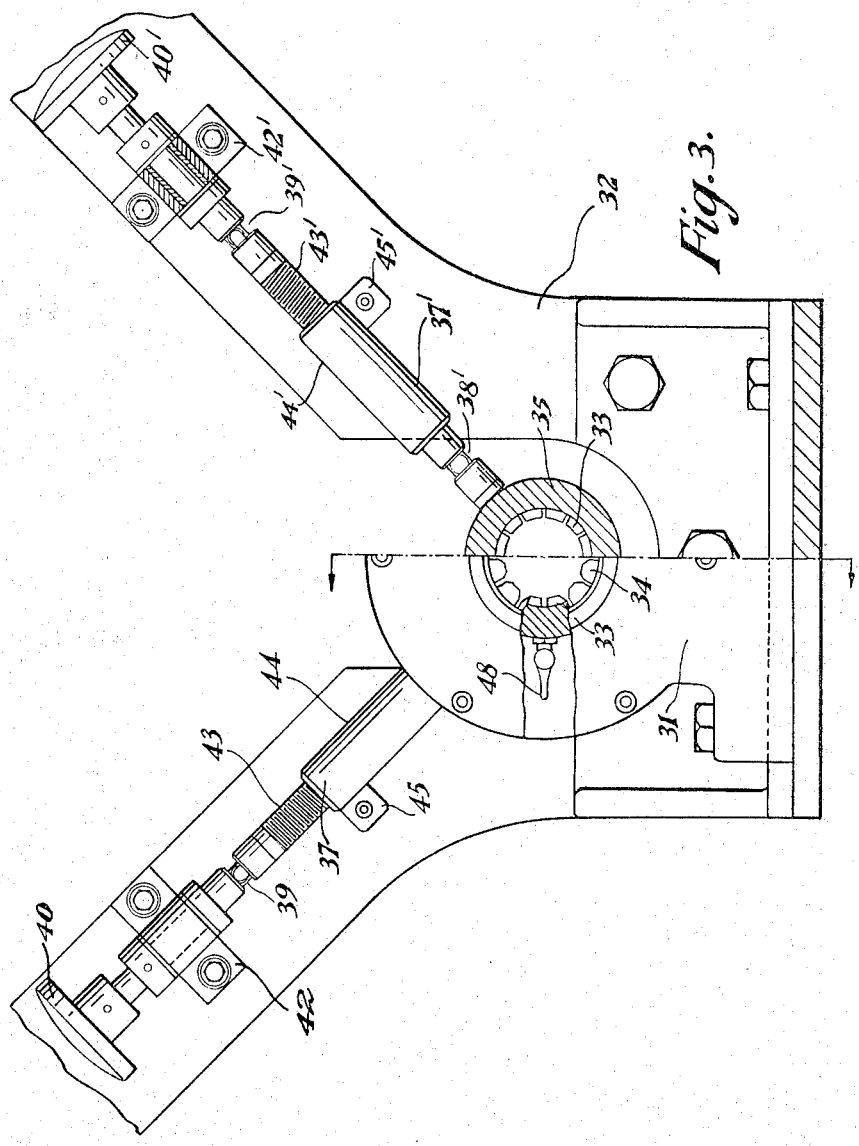
FIGURE 3 is a partly-sectioned (line 3—3 of FIGURE 4) end-view of a guiding device.

Referring to FIGURES 3 and 4, which represent a deflection device corresponding to FIGURE 1, two actuators 37 and 37' are attached to the free end of the tubular lever 35. The assembly is mounted on a baseplate 30 to which is fixed a pedestal bearing 31 and a shaped mounting plate 32.

Two guiding collets 33 and 34 are mounted in the tube 35, which is pivoted at one end in a self-aligning spherical ball-race 36. These components 33-36 correspond to components 3-6 of FIGURE 1. At the other end of the tube 35, the two actuators 37 and 37' are each attached by a universal joint 38, 38'. The free ends of the actuators 37 and 37' are attached by universal joints 39, 39' respectively to the drive mechanisms, which may be handwheels 40, 40' or motors (not shown). These are considered as alternatives; the same type of drive would preferably be chosen for both actuators. The end-thrust of the actuators is taken, via the universal joints 38, 38', 39, 39', by thrust bearings 42, 42' attached to the plate 32.

In the embodiment shown, the actuators are of the screw-and-nut type, 43, 43' being the screws and 44, 44' the nuts, but these devices may be of any convenient type, for example they might be replaced by any mechanism capable of providing linear motion, e.g., a crank, a cam, an eccentric or a rack and pinion, with direct mechanical drive or via a gear box; alternatively hydraulic actuators with suitable control valves or a solenoid operated device might be used.

The nuts are slit lengthwise and can be adjusted slightly in diameter by screws 45, 45' to take up wear in the thread. It will be understood that the universal joints 38, 38' are pinned to prevent rotation, hence the nuts in the actuators are also prevented from rotating. On the other hand the adjusting screws 43, 43' are rotated by the drive devices through the universal joints 39, 39'.

The ball race 36 is provided with cover plates 46, 47 to keep out dust and swarf from the cutting die, and a supply of filtered compressed air is connected to a nipple 48 (FIGURE 3) so that air is always blowing outwards from the ball-race housing.

If it is desired to use the arrangement shown in FIGURE 1a, the collet 33 is removed from this assembly and mounted separately, for example on plate 32, in a coaxial position.

Referring to FIGURES 5 and 6, the circular cutting die 50, made of a hard material such as tungsten carbide, is located in a tapered hole 51 in the frame 52 which mounts onto a bedplate (not shown). Thus the axis of the die is fixed and all adjustments of the other components are made relative to the die using setting pieces. Although it is not shown in the diagrams, the die is usually water-cooled to prevent heat transfer from the die to the core upon stopping, which can otherwise cause swelling of the core and give rise to circumferential "stop" marks.

In the example shown, the front surface 53 of the die is perpendicular to the parallel land 54, thus the included angle at the cutting edge is 90°. Other rake angles, both negative and positive, and other clearance angles have been used successfully in other applications.

The swarf is slit by two parting knives 55, which are positioned vertically by the screws 56. The mechanism here is similar to that commonly adopted in the jaws of an independent four-jaw chuck of a lathe. When in operation, the knives score the surface of the core, so that the cylindrical layer of swarf is readily split in halves for continuous removal.

In the application shown in FIGURES 5 and 6, the land of the die acts as a location for the shaved core during its passage through the eccentricity sensing device. The back surface 57 of the frame is machined at 58 to accept the flange of the sensing head. Location is by dowel and fixing by bolts (not shown).

FIGURES 7 and 8 show diagrammatically an eccentricity sensing head in cross-section and end view, FIGURE 7 being a cross-section on the line Z—Z in FIGURE 8. A housing 70 is mounted on surface 58, axially rotated through 45°, as compared with the views shown in FIGURES 7 and 8, so that the electrodes 71, 71' and 72, 72' are in the same planes as the actuators 37 and 37' respectively as mentioned above. Two pairs of diagonally placed electrodes 71, 71' and 72, 72' are clear of the surface of the shaved core. Since the direct capacitance of each electrode to the inner conductor is exceedingly small compared with the capacitance to its surroundings it is necessary to surround the electrodes with a live screen 73 and 76, using the known technique of balanced inductive ratio arms, originally due to Blumlein. The voltage drop in the inductive ratio arms at balance is negligible, and it is therefore possible to connect the guard circuit to the midpoints of both bridges, the guard thus serving equally for both. By this expedient it is possible to put both sets of electrodes in the same transverse section. This is advantageous because the length of unsupported core can thereby be reduced. Small errors in mounting the sensing head may be corrected by appropriate zero adjustments of the bridges.

FIGURE 9 shows a roller assembly through which the core is finally drawn off by the capstan, optionally through other machinery. This roller assembly is of a well-known type. It is commonly referred to as a "Turk's head." Each of the rollers 81 may be adjusted radially by means of adjusting sleeves 82, which are machined with hexagonal flats 85 to engage a spanner. Each of the sleeves has a groove turned externally in its shank, and is tapped to receive a stud 86 on the end of which a roller 81 is mounted. The groove is engaged by a semicurcular collar machined in the block 83. The rollers are finally fixed in position with setscrews 84. This guide may, if desired, be associated with a counter device for measuring the length of core passing through the machine.

Figure 10:
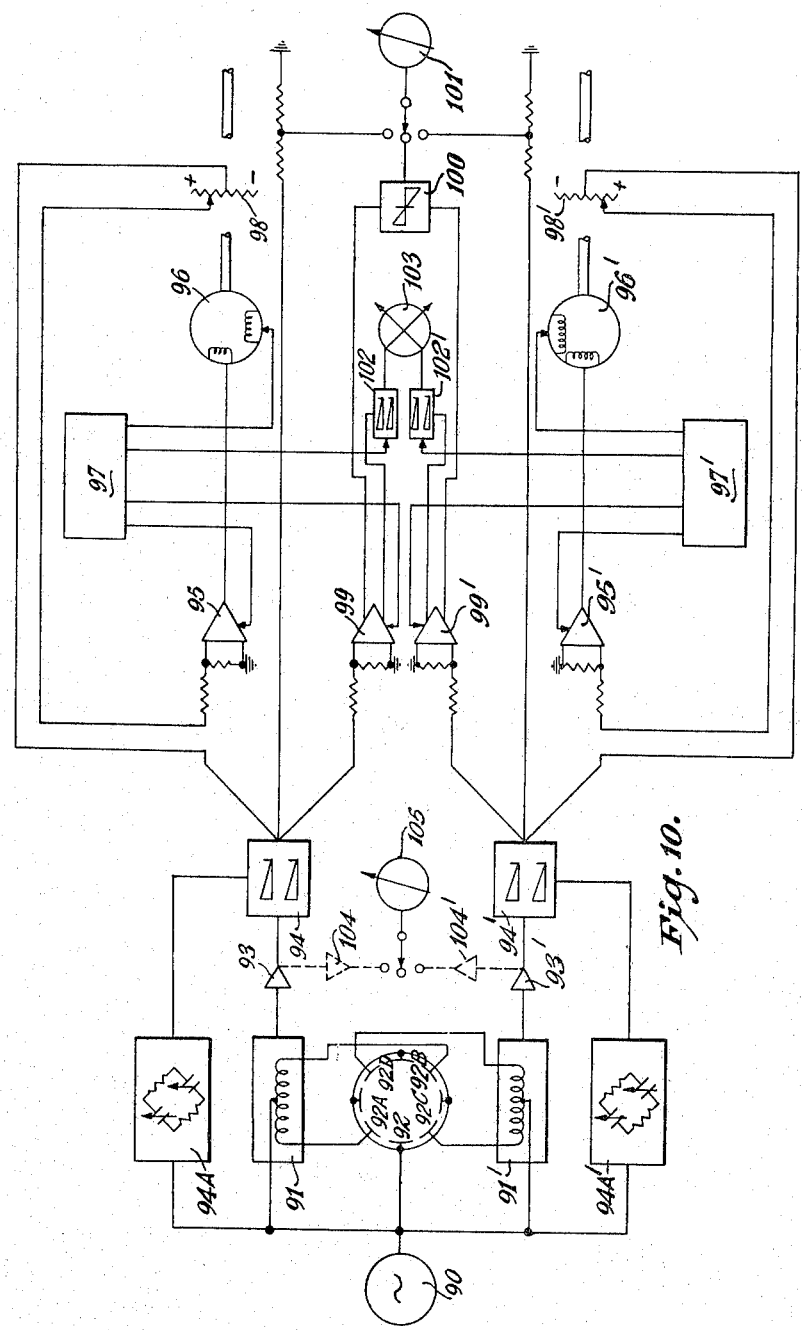
FIGURE 10 is a typical block schematic of the electrical control circuit.

FIGURE 10 shows a typical block schematic diagram of the sensing device and servo system. The two Blumlein bridges 91 and 91', which determine the eccentricity in the two mutually orthogonal places, by measuring differences in direct capacitance from electrodes 92A, 92B, 92C and 92D to the conductor, have zero adjustments (not shown) but are not otherwise balanced except by correcting the eccentricity. The centre points of the inductive ratio arms are connected together to the oscillator supply 90 which also feeds the guard electrode 92, see also 73 and 76, FIGURE 8. Thus when the bridge is balanced, all four electrodes, 92A, 92B, 92C and 92D are at the same potential as the guard electrode with respect to earth, whereas the conductor of the core, being at earth potential, is effective in disturbing the balance of the bridge if eccentricity is present. The out-of-balance voltage which appears across each pair of inductive ratio arms in 91 and 91' is amplified by amplifiers 93 and 93' respectively and applied to the inputs of modulators 94 and 94'. These are balanced modulators fed from the oscillator 90 via phasing networks 94A and 94A'. The latter networks are adjustable, by a procedure to be described, so that the modulators 94, 94' are responsive only to capacitative unbalance, ignoring stray leakance unbalance, thus producing D.C. outputs proportional to the eccentricity in each of the two planes, and having appropriate signs.

Part of each D.C. output is applied, via a pad and a feed-back potentiometer to the input of the respective chopper amplifier 95 or 95'. These amplifiers have a chopper at their inputs, driven respectively by A.C. mains supplies 97, 97'. Preferably these two supplies are in quadrature with each other; this can be arranged by an appropriate network or by means of a Scott transformer from a 3-phase supply. The outputs from 95, 95' are thus of mains supply frequency, e.g. 50 or 60 c./s., the same supplies being connected to the stator windings of motors 96, 96' respectively. These motors are two-phase induction motors, the other phase of said windings being respectively fed in quadrature from the amplifiers i.e. from 95 or 95' respectively. The quadrature relationship is not obtained in this case by using two different mains supplies 97, 97' but, as is well-known in the art, by making use of the inductance of the stator windings. In each motor, one winding is fed from a low impedance source and the other from a high impedance source. These motors correspond to the motors 40, 40′ mentioned in the description of FIGURES 3 and 4, although not shown. Feedback potentiometers 98, 98′ connected to D.C. supplies, provide feedback paths for the units 95, 96 or 95′, 96′, thus improving the linearity of response, and ensuring that there shall be a residual voltage at the output of the modulators 94, 94′ equal to that produced by the potentiometers 98, 98′, and indicative of the amount of eccentricity, even when the servo system has attained equilibrium. This arrangement necessarily requires that there shall be a small residual unbalance of the bridges 91, 91′ in order to produce the residual voltage at the modulator output, so that the process of adjustment does not quite reach completion. The amount of this residual unbalance may however be made negligibly small by providing sufficient gain in the amplifiers 93, 93′. This error disappears in any case for zero eccentricity of the extruded core. From this description it will be apparent that the voltage at the output of the modulators 94, 94′ is a measure both of the original eccentricity and of the eccentricity after correction. The percentage of eccentricity removed by the apparatus according to the invention can approach 100% within any desired small amount, determined by the circuit parameters, but the residual eccentricity, however small, will remain proportional to the original eccentricity. If desired the feedback potentiometers 98, 98′ may be omitted and the signal from the modulators 94, 94′ fed directly to the amplifiers 95, 95′.

The output of the modulators is also impressed on the chopper amplifiers 99, 99′, whose choppers, like those of 95, 95′, are fed from the mains supplies 97, 97′. The outputs of 99, 99′, at mains frequency and in quadrature relationship, are combined and rectified in the linear rectifier 100, whose output is thus a measure of the vector sum of the two D.C. outputs of 94 and 94′, and thus also a measure of the magnitude of the eccentricity. Two mains supplies in quadrature, 97 and 97′, were provided in order to obtain this facility, but the same result could have been obtained in other ways. The recorder 101, a D.C. instrument, can be switched to read the eccentricity in each plane or their vector sum.

The outputs of 99 and 99′ are also fed to phase-sensitive modulators or choppers 102, 102′, to give D.C. outputs. These are impressed on two moving coil meters 103 having crossed pointers and mounted in a common frame. The intersection of these pointers gives a convenient indication of the angular position in which the eccentricity lies with respect to the planes of the apparatus, i.e. of the electrodes and actuators.

A further facility is provided in order to check that the phasing networks 94A and 94A′ are correctly adjusted. A bridge detector 105 is connected to the output of 93 or 93′ via buffer amplifiers 104, 104′. A gauge known to have zero eccentricity is inserted in the electrode system, and the bridge balance is adjusted by the zero adjustment devices (not shown) in the units 91, 91′ until a zero reading is obtained on 105. The zero adjustment for leakance is then varied, and the reading of the recorder 101, when switched to the relevant modulator, is noted. If 101 now indicates an output for a known leakance unbalance, this means that the phase network 94A or 94A′ is wrongly adjusted, and should be corrected to restore the reading of 101 to zero. Subsequent to this adjustment, the zero adjustment for leakance is restored to the balance position, using 105 as the detector. The detector 105 is then switched to the other branch and the corresponding operation is repeated. Although the sensing device and servo system has been described herein with reference to a core shaving process, it will be understood that it may readily be used for other purposes where the eccentricity of a conductor is required to be measured, such as for example, the measurement and/or control of eccentricity during extrusion.

What is claimed is:

1. A method of shaving the extruded thermoplastic insulation of an electrical conductor having insulation thereon so as to leave a cylindrical surface having a predetermined diameter, the method including the steps of drawing the insulated conductor through a fixed cutting die to remove excess insulation material, slitting the resultant insulation swarf to permit removal of the latter in the form of at least one continuous ribbon, controlling the position and direction of approach of the insulated coinductor with respect to the die prior to its passage therethrough, and supporting the shaved insulated conductor in coaxial relationship with the die subsequent to its passage through the die.

2. A method as claimed in claim 1 and further including the steps of correcting the eccentricity of the conductor within the extruded insulation by deflecting the insulated conductor with respect to the axis of the die so as to present it to the cutting edge thereof with the axis of the conductor intersecting the axis of the die at a very small angle, in the plane of the cutting edge, straightening and drawing the shaved insulated conductor into coaxial alignment with the axis of the die, measuring any residual eccentricity of the conductor within the shaved insulated, and utilizing such measurement to control the extent of deflection of the insulated conductor prior to its passage through the die, so as to reduce any residual eccentricity to an acceptable amount.

3. A method as claimed in claim 2 in which the insulated conductor is presented to the cutting edge of the die with the axis of the conductor tangential to the axis of the die.

4. A device for shaving the extruded thermoplastic insulation of an electrical conductor so as to leave a cylindrical surface having a predetermined diameter, comprising a fixed cutting die, means for drawing the insulated conductor under tension through the die to remove excess insulating material, means for slitting the insulating material ahead of the die to permit removal of the swarf in the form of at least one continuous ribbon, means including at least one resilient guiding device for determining the position and direction of approach of the insulated conductor with respect to the die, and means, disposed coaxial with and close to the cutting die, for supporting and guiding the shaved insulated conductor.

5. A device as claimed in claim 4 wherein said guiding device is movable transversely with respect to the axis of the die.

6. A device as claimed in claim 4 in which the guiding device is mounted in a tube, one end of which is pivotable in a universal joint located near to, and coaxial with, the cutting die; the other end of the tube, into which the insulated conductor enters, being displaceable in approximately transverse directions with respect to the die, by two linear control devices, in approximately orthogonal relationship with each other.

7. A device as claimed in claim 6 in which a second guiding device is located adjacent, but spaced from, said other end of the tube.

8. A device as claimed in claim 6 in which a second guiding device is mounted within the tube and adjacent the end thereof remote from the die.

9. A device as claimed in claim 6, in which the linear control devices comprise hydraulic or screw actuators.

10. A device as claimed in claim 6 in which the universal joint comprises a self-aligning ball race.

11. A device as claimed in claim 4 in which the cutting die is formed in two parts, the division between the two parts being in a plane which excludes the longitudinal axis of the die.

12. A device as claimed in claim 4 in which the cutting die has a sharply defined cutting edge with small angles of rake and clearance, the angle subtended by the cutting edge approaching a right angle.

13. A device as claimed in claim 4 and further comprising means including a capacitative electrode system for measuring any residual eccentricity of the conductor within the shaved insulating material, and means for controlling the movement of at least one of the guiding devices in response to the output of the measuring means, so as to reduce any residual eccentricity to an acceptable amount.

14. A device as claimed in claim 13 in which the capacitative electrode system comprises at least three electrodes disposed in the form of segments of a cylindrical surface, between two transverse planes, the electrodes being provided with a common guard electrode.

15. A device as claimed in claim 13 in which the electrode system is coaxially located with respect to the axis of the cutting die, and between two closely spaced guides, closely fitting the shaved insulated conductor.

16. A device as claimed in claim 15 in which one of the closely spaced guides is constituted by a die ring attached to the cutting die.

17. A device as claimed in claim 4 including first and second parting knives positioned respectively above and below the cutting edge of the die, for slitting the cylindrical layer of swarf into halves for continuous removal.

No references cited.

WILLIAM W. DYER, JR., *Primary Examiner.*

G. A. DOST, *Assistant Examiner.*